United States Patent Office 2,957,837
Patented Oct. 25, 1960

2,957,837

POLYESTER RESIN COMPOSITIONS OF LONG CHAIN DIETHYLENICALLY UNSATURATED ACIDS

Curtis W. Smith, Greenwich, Conn., and Clayton A. May, Piedmont, Calif., assignors to Shell Development Company, New York, N.Y., a corporation of Delaware No Drawing. Filed Nov. 5, 1956, Ser. No. 620,211

12 Claims. (Cl. 260—22)

This invention relates to novel ester products. More particularly, it relates to novel polyester resins which may be prepared from polyhydric alcohols and polycarboxylic acids.

As used herein the term "alkyd" is taken to mean the resin product comprising the reaction product of a polyhydric alcohol, usually having two or more hydroxy groups, and a polycarboxylic acid. It is used here, as in the art generally, to indicate that the product is not necessarily linear. The term "linear polyester" is taken to mean the resin product comprising the reaction product of difunctional alcohols and difunctional carboxylic acids. The term "polyester" is understood to mean the reaction product of polyhydric alcohols and polybasic acids without regard to the number of hydroxy and carboxy groups present. It includes the alkyds, the linear polyesters and modified forms thereof.

Polyester resins, i.e., resins prepared by reacting a polyhydric alcohol and a polybasic acid, or derivatives thereof, are valuable compositions as they are widely used in casting, laminating and coating compositions. Ordinarily, however, a composition of the reaction product of polyhydric alcohols and polybasic acids, or derivatives thereof, alone are not suitable for these purposes and they must be modified by other ingredients. Numerous modifying agents have been proposed for polyester compositions and have met with success. However, there still remains certain properties of polyester resins which need improvement. Such properties include flexibility, water resistance, bodying characteristics, and the like.

It is therefore an object of this invention to provide novel polyester resins which have certain improved physical and chemical properties. More particularly, it is an object of this invention to provide novel alkyd resins of improved flexibility, water resistance and bodying characteristics. Another object of this invention is to provide tough linear polyesters of improved water resistance and thermal stability. Yet another object of this invention is to provide methods for producing the novel polyesters of this invention. Other objects will become apparent as the description proceeds.

These and other objects are accomplished by polyester resins comprising the reaction products of a polyhydric alcohol and a polycarboxylic acid, said acid having the formula HOOC—R—COOH wherein R is a divalent chain having from 14 to 26 carbon atoms, said chain being further characterized by 2 unsaturated linkages at least 4 carbon atoms removed from each other and at least 4 carbon atoms removed from the 2 carboxy groups. Polyesters prepared in this manner are useful in surface coating compositions, such as lacquers and enamels, and in casting compositions such as Fiberglas reinforced laminates, and a multitude of other molded products. These resins, which are in general relatively high melting solids, have an unusually high degree of compatibility with known film forming materials and the solvents and diluents employed therewith. Solutions containing these polyesters, particularly the alkyds, generally have low viscosities so large quantities of the resin may be tolerated to form strong durable films.

It is an outstanding advantage of this invention that the simple reaction product of a polyhydric alcohol and a dibasic acid of the formula HOOC—R—COOH find useful applications as synthetic drying oils. Additionally, the reaction product may be cured with various peroxides and used in polyester rubbers, foam rubbers such as the polyurethanes, and the like. This will be recognized as a substantial advance in the art as it has heretofore been felt that the reaction product of a polyhydric alcohol and a polybasic acid had no suitable utility without the addition of various modifying agents. For such products a ratio of about 1:1 of the acid to the polyol is preferred but the latter may be present in a slight excess, i.e., about 5% based on the weight of the dicarboxylic acid.

In the preferred embodiment of the products of this invention, the above-described dicarboxylic acids of the formula HOOC—R—COOH are used as modifying agents in compositions which are essentially polyesters either of the linear or the alkyd type. The advantage of this type of formulation is that the physical properties such as the water resistance, flexibility, etc., of the polyesters are thereby improved.

When used as a modifying agent for linear polyester resins the dicarboxylic acid of the formula HOOC—R—COOH is contained as an additional reactant for polyhydric alcohol-dicarboxylic acid reaction products. Such compositions are capable of wide variation as not only may the individual reactants be selected from a rather wide variety but also the proportions of the reactants may also be widely varied.

The compositions of this invention are distinguished from other polyester resins in that they are prepared from a dibasic acid of the formula HOOC—R—COOH wherein R is a divalent chain having from 14 to 16 carbon atoms, said chain being further characterized by two unsaturated linkages at least 4 carbon atoms removed from each other and at least 4 carbon atoms removed from the carboxy groups. In the above formula R may be either a straight chain or it may contain branching. Typical acids of the type defined by the formula HOOC—R—COOH include 4,17-dicarboxylic-8,12-eicosadiene-1,20-dioic acid, 8-vinyl-10-octadecene-1,18-dioic acid, 7,11-octadecadiene-1,18-dioic acid, 7-vinyl-9-hexadecene-1,16-dioic acid, and the like. The dicarboxylic acids and the processes for their preparation are fully described in copending application Serial No. 432,026, filed May 24, 1954. It is sufficient to state, however, that they may be prepared by reacting, under redox conditions, a conjugated diethylenic compound for instance, a conjugated diethylenic hydrocarbon or a mixture of two or more such conjugated diolefinic compounds with one or more cyclic peroxide compounds of 4 to 10 carbon atoms in a primary ring having a hydroxyl or substituted hydroxyl group directly attached to the same cyclic carbon atom as the peroxygen linkage.

Having thus described the essential ingredient of the novel products, it will be understood that they include a number of dibasic acids of high molecular weight. As previously indicated, the preferred embodiment of the novel compositions is that where the above described acids are used as modifying agents in polyester resins although they may be simply reacted with polyhydric alcohols to form products having unexpected utility. When used as a modifying agent the acids may replace part or all of polyfunctional acids or anhydrides that have heretofore been used. It is more preferred however, that they be used to replace part of the acids, or anhydrides, rather than replace all of them. This is desired as it is found that the acids described above will impart certain improved properties to polyester resins, but not certain other properties. Thus for example, where a hard polyester resin is desired that has improved water resistance, part of the polybasic acid or anhydride that contributes to the hardness may be replaced with the above described dibasic acids to improve water resistance.

This may be better described by making reference to various representative formulations of polyester resins:

Linear polyester—
  (for casting and laminating compositions)
    HOOC—R—COOH, as described above
    Dihydric alcohols
    Unsaturated acids and/or anhydrides of the type represented by maleic acid and anhydride, fumaric acid, itaconic acid, and the like
    Monomeric vinyl compounds, e.g. styrene, etc.
    Catalysts
    Curing agents with accelerators
  Other ingredients:
    Dibasic saturated acids and/or anhydrides, e.g. phthalic acid, adipic acid, etc.
    Fillers
    Dyes and pigments
    U-V stabilizers
  (for surface coating compositions)
    HOOC—R—COOH, as described above
    Dihydric alcohols
    Driers as cobalt naphthenate, magnesium naphthenate
  Others (some optional)
    Unsaturated acids and/or anhydrides, of the type represented by maleic acid and anhydride, fumaric acid, itaconic acid and the like
    Dibasic saturated acids
    Monomeric vinyl compounds, e.g., styrene, etc.
    Solvent
    Curing agent
Alkyd resin—
  (for surface coating compositions)
    HOOC—R—COOH as described above
    Polyhydric alcohols having more than two hydroxy groups
    Dibasic acid or anhydride represented by phthalic acid and/or anhydride, adipic acid, etc.
    Drying oil fatty acids or drying oils
  Others:
    Solvent
    Dyes and pigments
    Monohydric alcohols or monobasic acids The foregoing formulations are merely representative illustrations of polyester resins included within the scope of this invention. Persons skilled in the art will readily understand that the illustrative formulations are capable of considerable variation not only as to the specific ingredients but also as to the quantities used and their specific applications. Thus for example, it is well known that for most surface coating applications the alkyd resin formulations are preferred to the linear polyester formulations.

The type of alcohol used in the preparation of the polyesters will depend on the product desired. If linear polyesters are desired one should select a dihydric alcohol, and preferably an aliphatic dihydric alcohol, such as, for example, ethylene glycol, diethylene glycol, triethylene glycol, 1,5-pentanediol, 1,3-propanediol, hexanediol-1,6, 3-ethyl hexanediol-1,3, glycerol monoallyl ether, 2,4-butadien-1,4-diol, 2,8-dodecanediol, thiodipropanol, sulfonyldipropanol, glycerol monobutyrate, 2,5-dimethyl-2,6-heptanediol, and the like. Particularly preferred alcohols to be used for this purpose are the alkanediols and especially those containing no more than 12 carbon atoms.

If an alkyd resin for coating compositions is to be prepared, one should preferably select a polyhydric alcohol having at least three hydroxyl groups, such as, for example, glycerol, hexanetriol, pentaerythritol, mannitol, methyltrimethylolmethane, 1,4-octanetriol, 1,3,7-heptanetriol, polypentaerythritol, polyallyl alcohol, polymethylallyl alcohol, tetrahydroxycyclohexane, trihydroxybenzene, 3,5-dithiooctanetriol, polyols formed by the condensation of bis-phenols with epichlorohydrin, and the like. Particularly preferred alcohols of this type comprise the aliphatic alcohols possessing from 3 to 6 esterifiable hydroxyl groups, and more preferably the alkanepolyols possessing from 3 to 5 hydroxyl groups and not more than 12 carbon atoms.

The polycarboxylic acids which may be used in the preparation of the novel polyester resins may be saturated, unsaturated, alicyclic or aromatic, and may possess two, three, four or more carboxyl groups and may be substituted or unsubstituted. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, 1,8-napthalenic, adipic, sebacic, azelaic, pimelic, chlorosuccinic, bromomaleic, dichlorophthalic, dilatic, dihydracrylic, benzophenone-2,4'-dicarboxylic acid, and the like.

The preferred polycarboxylic acids to be used in producing the novel polyester resins are the dicarboxylic acids containing from 2 to 10 carbon atoms, such as succinic acid, glutaric acid, adipic acid, suberic acid, maleic acid, cyclohexanedicarboxylic acid, phthalic acid, diethyl phthalic acid, and the like. Particularly preferred polycarboxylic acids are the aromatic dicarboxylic acids containing from 6 to 10 carbon atoms wherein the two carboxyl groups are attached directly to the aromatic ring.

In some cases it may be desirable to utilize other forms of the acid, such as the acid anhydrides or the acid chlorides, as phthalic anhydrides, maleic anhydride, succinic chloride, and the like.

Esters of the polybasic acids may be utilized in case the novel resins are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, and amyl alcohol.

The above-described dicarboxylic acids of the formula HOOC–R–COOH may be employed as the sole modifying agent or the said acids may be employed in combination with other types of modifiers. If other agents are employed their selection will depend chiefly upon the type of final product desired. Non-drying alkyds may be prepared by using modifying agents, such as the acids derived from coconut, castor and cottonseed oil, carboxylic acids as lactic acid, benzoic acid, chlorobenzoic acid, stearic acid, salicylic acid, mucic acid, sorbic acid, butyric acid, and propionic acid, and the like, as well as mixtures thereof.

Alkyds having air-drying properties may be prepared by employing various unsaturated modifying agents. Examples of such agents are tall oil acids or the acids derived from the drying oils as linseed, soybean, perilla, tung, walnut, and oiticica oil, and the monoglycerides of the fatty acids of these drying oils, such as the monoglycerides of linseed oil, monoglycerides of the fatty acids of soybean oil, and the like, as well as mixtures thereof.

Other types of modifiers include the organic plastic substances, such as protein plastics, natural resins, such as rosin, and synthetic resins. Phenyl-aldehyde, urea-aldehyde, alkyd resins and synthetic linear polyamides represent suitable condensation-type synthetic resin modifiers. Large numbers of synthetic resins resulting from the polymerization of unsaturated compounds can also be used as modifiers. Typical examples of this type of agent are resins formed from styrene, alpha-methylstyrene, vinyl chloride, vinylidene chloride, vinyl acetate, methyl acrylate, methyl methacrylate, and derivatives of some of these resins. Another group consists of plastics formed by the polymerization and copolymerization of conjugated dienes, such as butadiene, pentadiene and hexadiene. A special group consists of the resins formed from those compounds having two or more polymerizable non-conjugated double bonds, such as the unsaturated aliphatic polyesters of saturated polybasic acids, e.g., trialkyl cyanurate, divinyl, diallyl and dimethallyl esters of oxalic, malonic, citric and tartaric acids; the unsaturated polyethers of saturated polyhydric alcohols, e.g., divinyl and diallyl ethers of glycol, diethylene glycol and the corresponding di- and triethers of glycerol, and the like; the unsaturated aliphatic monohydric alcohol esters of unsaturated monocarboxylic acids, e.g., vinyl, allyl, and methallyl acrylate; and the unsaturated esters of aromatic dicarboxylic acids, e.g., divinyl, diallyl and dimethallyl phthalate.

In addition to the modifiers already mentioned many other types of modifying agents may be employed. Important compositions are formed in many cases by adding before, during or after the formation of the alkyd materials such as colophony, shellac, copal, dammar, camphor, naphthalene, antracene, aryl phosphates, alkyl and aryl phthalate, pitch, asphalt, asbestos, sand, talc, mica, wood flour, cotton, and the like.

Preferred modifying agents to be employed with the novel agents of the invention are the members of the group consisting of carboxylic acids, particularly unsaturated fatty acids, glyceride oils, synthetic resins, natural resins, and mixtures thereof.

In the preparation of the novel polyester resins any one of the above-described polyhydric alcohols may be combined with any one of the above-described polybasic acids, or derivatives thereof, and any one of the above-noted substituted carbocyclic monocarboxylic acids, or mixtures of one, two or all three of the said reactants. If other types of modifying agents are to be used with the said carbocyclic acids they may be employed singly or in admixture with one another, e.g., a mixture of non-drying agents or drying agents, or a mixture of a non-drying agent with a drying agent may be utilized.

The production of the polyester resins may be accomplished by any suitable method. They may be prepared, for example, by mixing the polyhydric alcohol, polybasic acid or derivative thereof and the modifying agent or agents in any order and then heating the resulting mixture, or alternatively, by first heating and reacting the polyhydric alcohol with the polybasic acid or derivative and subsequently adding the modifying agent or agents, or by first heating the alcohol with the modifying agent or agents and then adding the polybasic acid or derivative.

The resins are preferably prepared, however, by mixing the polyhydric alcohol with the polybasic acid or derivative and the desired modifying agent or agents, and subjecting the resulting mixture to heat. Ordinarily, no catalyst need be employed to effect this reaction, but if desired substances, such as p-toluenesulfonic acid, zinc chloride, stannic chloride, calcium acetate, barium acetate, zinc acetate, hydrochloric acid, litharge, etc., in amounts preferably varying from 0.1% to 5% by weight of reactants may be employed.

The proportions in which the alcohol and polybasic acid or derivative are combined will vary over a considerable range. Ordinarily the polyhydric alcohol and polybasic acid or derivative will be employed in equimolecular amounts, but satisfactory results are obtained when there is up to 40 mol percent excess of either reactant. Preferably, the polybasic acid or derivative is reacted from an equipmolecular to 25 mol percent excess of the polyhydric alcohol.

The amount of the modifying agent to be utilized will vary over a considerable range depending upon the type of product desired. The total amount of the modifying agent or agents will generally vary from 5% to 95% by weight of the resulting resin, with a preferred range varying from 30% to 60% by weight of the said resin. Higher or lower amounts may be employed, however, if desired or necessary. The entire quantity of the modifying agent may be made up of the above-described novel dibasic acids of the formula HOOC—R—COOH or part thereof may be replaced by any of the other agents described hereinabove. When mixtures of agents are employed, the ratio in which they are combined will vary according to the nature of the desired product but the amount of the dibasic acids should preferably make up at least 2% and preferably from 5% to 60% of the total quantity of the modifying agent.

The temperature employed during the resin-forming reaction may vary over a considerable range depending upon the type of reactants, catalysts, etc. In most cases the temperature will range between about 100° C. and about 300° C., with a preferred range varying between 120° C. and 250° C.

The resin-forming reaction may be accomplished in the presence or absence of solvents or diluents. If solvents or diluents are employed it is desirable to utilize inert organic compounds, such as benzene, toluene, xylene, cyclohexanone, chloroform, carbon tetrachloride, and the like.

It is preferred in most cases to accomplish the resin-forming reaction under a blanket of an inert gas, at least during the initial stages of the reaction. By an inert gas is meant one substantially devoid of oxygen, such as nitrogen, carbon dioxide, and the like. Atmospheric, superatmospheric, or subatmospheric pressures may be used.

The water formed during the reaction may be removed during the said reaction or at its completion. It is preferably removed substantially as fast as it is formed therein. The removal of the water may be accomplished by any suitable means, such as distillation and the like.

Since the alkyds are heat-convertible, care should be taken during the reaction to avoid converting the resin to a step beyond that of being fusible. This will occur if the reaction mixture is overheated or heated too long. To avoid such difficulty the course of the reaction is conveniently followed by making determinations of the viscosity and acid number upon samples withdrawn from the reaction mass or by other well known methods. Ordinarily the heating is continued until the viscosity has reached the desired value and the acid number has been reduced to a value between about 5 and 30.

When the reaction is substantially complete as shown by the above-described methods the inert solvents or diluents, remaining water, uncombined reactants and by-products are preferably removed from the reaction mixture. Removal is conveniently accomplished by vacuum distillation, although fractional distillation, precipitation, etc., may also be utilized.

If alkyd resins having extremely low acid numbers are desired they may be conveniently prepared by the ester-exchange method mentioned above. According to this process the esters of the polyhydric alcohol and/or esters of the polycarboxylic acids in the proportion described hereinabove for the alcohols and acids, are heated together in the presence of an ester-exchange catalyst, and the alcohol, acid or ester formed in the reaction is removed, preferably as fast as it is formed.

The novel modified alkyds of the invention may be utilized for a variety of important industrial purposes. They may be used, for example, as shellac substitutes, as resinous binders, for molding compositions and for many other uses in the various arts.

The alkyds are particularly valuable as additives for film-forming compositions. The air-drying alkyds of the invention, are useful, for example, as additives for synthetic and natural drying oils in the preparation of improved varnishes. The non-drying alkyds are especially valuable as additives for coating compositions containing amide-aldehyde-type resins, cellulose derivatives, and the vinyl-type polymers. The expression "amide-aldehyde-type resin" refers to the resinous products obtained by condensing aldehydes with amides. Such resins are sometimes referred to as "aminoplasts." Aldehydes used in producing this type of resin may be exemplified by formaldehyde or compounds engendering formaldehyde (e.g., paraformaldehyde, hexamethylene tetramine, etc.), acetaldehyde, propionaldehyde, butyraldehyde, acrolein, methacrolein, crotonaldehyde, benzaldehyde, furfural, etc., and mixtures thereof. The amides used in producing the said resins may be exemplified by urea, thiourea, diurea, hydroxy urea, ethanol urea, unsymmetrical diphenyl urea, diethylene triurea, methyl urea, acetyl urea, phenyl thiourea, asymmetrical diethyl urea, methylene ureas, guanidine, dicyandiamide, melamine, and the like.

The novel alkyds are especially valuable as additives for coating compositions containing cellulose derivatives, such as cellulose nitrate, cellulose acetate, cellulose acetate butyrate, cellulose propionate, cellulose isobutyrate, cellulose crotonate, cellulose stearate, and cellulose valerate; ethyl cellulose, methyl cellulose, benzyl cellulose, glycol cellulose, cellulose acetopropionate, cellulose acetotartarate, and the like, and mixtures thereof.

The preferred cellulose derivative to be used with the novel resin is nitrocellulose. Various grades of nitrocellulose may be employed. Ordinarily, R.S. ½ sec. nitrocellulose will be used, although lower viscosity grades like R.S. ¼ sec. or higher viscosity grades like R.S. 6 sec. may be employed if desired.

A single alkyd of the invention may be added to the above-described film-forming materials or solutions thereof, or a mixture of two or more of the said alkyds may be utilized. The amount of the alkyds to be added will vary over a considerable range depending upon the type of film-forming material, intended use of the finished product, etc. In general, 1 part to 300 parts of resin will be used for every 100 parts of film-forming material. Ordinarily, in the production of coating compositions, such as lacquers, the amount of the alkyd will vary from 25 parts to 150 parts.

In the preparation of coating compositions, the alkyds and film-forming materials are combined together in a liquid vehicle which is usually employed in the preparation of such coatings, as ethyl acetate, isopropyl acetate, n-butyl acetate, methyl ethyl ketone, isobutyl ketone acetone, ethylene glycol ethyl ether, toluene, xylene, ethyl alcohol, n-butyl alcohol, various petroleum fractions, and the like, and mixtures thereof. The amount of the vehicle employed will vary over a wide range depending chiefly upon the viscosity desired in the finished solution. In general, amounts of vehicle varying from 5% to 95% of the total solids content are usually satisfactory.

Other materials, such as plasticizers like dibutyl phthalate, dioctyl phthalate, tricresyl phosphate, and the like, as well as additives, such as kopal, kauri, dammar and ester gum may also be added. If colored compositions are desired, pigments and coloring materials, such as titanium pigments, may be incorporated in appropriate amounts.

Coating compositions in appropriate solvents may be applied to substantially any surface, such as steel or wood either primed or unprimed by spraying, brushing or other methods. The solvents may be evaporated at room temperature but in many cases it is preferred to bake the coatings by application of infra-red rays or in a suitable oven. In the latter case, high temperatures may be used without discoloring or causing decomposition of the coating.

The coating compositions may also be used to impregnate fabrics or glass fibers. It is also feasible to introduce the compositions into or to apply it to fibers, such as wood flour employed in the preparation of molding powders.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

EXAMPLE I

About 16.2 parts of 8,12-eicosadiene-1,20-dioic acid, 25.1 parts of phthalic anhydride, 20.8 parts of glycerol and 45.3 parts of soya fatty acids are placed in a reaction vessel equipped with an agitator, reflux condenser, thermometer and heating and cooling means. The mass is heated over a period of one hour to 240–250° C. and held in that range until the desired viscosity is attained. A slow stream of nitrogen is sent through the charge to eliminate the air and carry away the water of esterification. The resulting product is a solid alkyd resin having the characteristics indicated in Table I. The control sample is prepared in the same manner as the above product except that the 8,12-eicosadiene-1,20-dioic acid is replaced by a stoichiometric amount of phthalic anhydride as follows: 49.8 parts soya fatty acids, phthalic anhydride 34.6 parts and glycerol 22.9.

Table I

| | Product of Example I | Control |
|---|---|---|
| Reaction Time at 250° C. (hrs.) | 1.4 | 3.0 |
| Acid No. | 6.3 | 5.3 |
| Molecular Weight | 1,624 | 1,787 |
| Hours to Gell Charge | 1.9 | 6.2 |
| Acid No. at Gel point | 4.1 | 2.8 |
| 50% in T.S. 27: | | |
| Color (Gardner) | 7 | 4 |
| Viscosity (Gardner-Holdt) | T-U | T-U |

Table II is an evaluation of the alkyd of Example I in comparison to the conventional formulation described above. The evaluation is of a surface coating which has been reduced to a viscosity of E–F (Gardner-Holdt) prior to application.

Table II

| | Product of Example I | Control |
|---|---|---|
| Water Resistance After 48 Hr. Air Dry: | | |
| 15 Min. Boil (Haze) | none | very slight. |
| 18 Hour, Room Temp. (Haze) | none | slight. |
| Sward Hardness: | | |
| 1 week | 3 | 10. |
| 4 weeks | 2 | 9. |
| Kauri Reduction: | | |
| Percent Passing | 170 | 100. |

EXAMPLE II

The procedure of Example I is repeated except that all the phthalic anhydride is replaced by 8,12-eicosadiene-1,20-dioic acid. The desired viscosity was reached after heating for 45 minutes at 250° C. The alkyd resin thus prepared has an acid number of 20.3, a viscosity at 50% dilution with TS-27 of H on the Gardner-Holdt scale and a color of 10–11 on the Gardner scale.

EXAMPLE III

The procedure of Example I is repeated except that 7,11-octadecadiene-1,18-dioic acid prepared by the reaction of cyclopentanone peroxide, butadiene and a redox catalyst in the presence of sulfuric acid, replaces the 8,12-eicosadiene-1,20-dioic acid. The product is an alkyd resin comparable to that of Example I.

The linear polyester resins, as distinguished from the alkyd resins, are largely used in glass fiber reinforced laminates. The novel polyester resins of the invention have improved water resistance and thermal stability as will hereinafter appear. Generally, the linear polyester resins are prepared after heating the reaction mixture to about 215° C. and maintaining that temperature until a final acid number of about 40 is reached. Thereafter, styrene or other modifiers such as diallyl phthalate, various acrylates, triallyl cyanurate, or the like, are added to make a solution of about 70%. Alternatively the reactants may be heated at about 200° C. in the presence of an inert hydrocarbon diluent which functions to remove the water of esterification. The following examples will illustrate the processes more fully.

EXAMPLE IV

To a reaction vessel equipped with a reflux condenser, agitator, thermometer, heating and cooling means, and inlets and outlets, are charged 22.9 parts of phthalic anhydride, 32.1 parts of maleic anhydride, 18.1 parts of ethylene glycol, 22.3 parts propylene glycol and 14.7 parts of 8,12-eicosadiene-1,20 dioic acid. The temperature is raised over a period of one hour to 160° C. and held at a temperature of 160, 180 and 200° C. for 1 hour, respectively. The temperature is then raised to 210–215° C. until an acid number of 60 is reached. A vacuum of 150 mm. Hg is slowly applied until an acid number of 40 is reached whereupon the charge is cooled to 130° C. and styrene is added to make a 70% solution. Test specimens ⅛ inch thick are cast using heat and peroxide catalysts then tested to give the results indicated in Table III. In the same manner a control sample is prepared from phthalic anhydride 29.7 parts, maleic anhydride 32.7 parts, ethylene glycol 17.4 parts and diethylene glycol 29.8 parts. In the control sample the 8,12-eicosadiene-1,20-dioic acid of the test sample is replaced by equivalent amounts of other modifying acids.

*Table III*

| | Product of Example IV | Control |
|---|---|---|
| Flexural Strength, p.s.i. × $10^{-3}$ | 11.2 | 12.1. |
| Modulus, p.s.i. × $10^{-6}$ | 0.31 | 0.31. |
| Compressive Strength, p.s.i. × $10^{-3}$ | 28.3 | 32.5. |
| Modulus, p.s.i. × $10^{-6}$ | 0.37 | 0.38. |
| Heat Distortion point, °C | 52.3 | 55. |
| Izod Impact Strength, notched, ft. lbs./in. | 0.18 | 0.23. |
| Barcol Hardness: | | |
| Room Temp | 31 | 30. |
| 1 day cold water immersion | 33 | 32. |
| 14 day cold water immersion | 22 | 17. |
| 28 day cold water immersion | 20 | 13. |
| After 24 hours at 150° C.: | | |
| Degree of yellowing | moderate | large. |
| Appearance | O.K. | cracked. |

Analogous results are obtained when greater proportions of 8,12-eicosadiene-1,20-dioic acid replaced the phthalic anhydride and/or maleic anhydride.

EXAMPLE V

The procedure of Example IV is repeated except that 7,11-octadecadiene-1,18 replaces the long chain diethylenically unsaturated acid. The product is a polyester resin comparative to that of Example IV.

EXAMPLE VI

The procedure of Example IV is repeated except that an equivalent amount of 6,10-hexadecadiene-1,6-dioic acid obtained by the reaction of cyclobutyl peroxide, butadiene and sulfuric acid in the presence of a redox reducing agent, replaces the 8,12-eicosadiene-1,20-dioic acid. The product is a polyester resin that is comparable to that of Example IV.

EXAMPLE VII

To a reaction vessel equipped as in Example I is charged a mixture of 155 parts of a mixture of about 80% 8,12-eicosadiene-1,20-dioic acid and 20% 8-vinyl-10-octadecene-1,18-dioic acid and 52.5 parts of diethylene glycol. The temperature is slowly raised to 220° C. over a period of 7 hours and held at that temperature for an additional 6 hours. An inert atmosphere of nitrogen is circulated through the reaction vessel during this time. The reaction product is a viscous liquid and had a solids content of 43.5% in a 1:1 methyl ethyl ketone-toluene solution. The solution has a Gardner-Holdt viscosity of E–F and a Gardner color of 10. The product has an iodine number of 118 g./100 g., a molecular weight ranging from 2000 to 3000 and an acid number of 8. The product is found to have air drying properties similar to that of linseed oil.

EXAMPLE VIII

To a reaction vessel as equipped in Example I is charged 1.5 moles of adipic acid, 1 mole of 8,12-eicosadiene-1,20-dioic acid, .5 mole of phthalic anhydride and 4 moles of glycerine. The mixture is reacted at 220° C., in an atmosphere of nitrogen, to an acid number of 35. When the reaction product is mixed and reacted with toluene diisocyanate, an emulsifying agent, plasticizer, etc. there is produced a polyurethane foam. By varying the quantities of the various reactants, foams are obtained having varying degrees of flexibility and specific gravity. Other polyurethane resin compositions may be obtained by merely varying the formulation as is well known in the art.

In a manner similar to that in the above examples other resinous compositions are obtained by using other carboxylic acids of the formula HOOC—R—COOH described above.

We claim as our invention:

1. A modified polyester resin having an acid number ranging from about 5 to about 50 comprising the reaction products of a mixture comprising phthalic acid anhydride, an equal molecular quantity of glycerol, the total amount of the anhydride and glycerol ranging from 95% to 5% by weight, and 5% to 95% by weight of an acid having the formula HOOC—R—COOH wherein R is a divalent radical having from 14 to 26 carbon atoms, said radical having two unsaturated linkages which are at least four carbon atoms removed from each other and at least four carbon atoms removed from the carboxy groups, said polyester being prepared at temperatures ranging from about 100 to about 300° C.

2. A resin composition having an acid number ranging from about 5 to about 50 comprising the reaction product of phthalic anhydride, glycerol, soya fatty acids and 5% to 95% of an acid having the formula

HOOC—R—COOH wherein R is a divalent radical having from 14 to 26 carbon atoms, said radical having two unsaturated linkages which are at least four carbon atoms removed from each other and at least four carbon atoms removed from the carboxy groups, the amount of the anhydride and glycerol as to each other ranging from equimolar amounts to an excess up to about 40 mole percent, the amount of soya fatty acids ranging from 2 to 60% of the acid of the formula HOOC—R—COOH, said polyester being prepared at temperatures ranging from about 100° C. to about 300° C.

3. The composition of claim 2 in which the acid of the formula HOOC—R—COOH is selected from the group consisting of 8,12-eicosadiene-1,20-dioic acid, 8-vinyl-10-octadecene-1,18-dioic acid and mixtures thereof.

4. The composition of claim 2 in which the acid of the formula HOOC—R—COOH is 8,12-eicosadiene-1,20-dioic acid.

5. The composition of claim 2 in which the acid of the formula HOOC—R—COOH is 8-vinyl-10-octadecene-1,18-dioic acid.

6. A polyester resin having an acid number ranging from about 5 to about 50 comprising from about 10 to 30% by weight of phthalic anhydride, from about 20 to 40% by weight of maleic anhydride, from about 10 to 30% by weight of ethylene glycol, from about 10 to 40% propylene glycol and an acid having the formula HOOC—R—COOH wherein R is a divalent radical having from 14 to 26 carbon atoms, said radical having two unsaturated linkages which are at least four carbon atoms removed from each other and at least four carbon atoms removed from the carboxy groups, said polyester being prepared at temperatures ranging from about 100 to about 300° C.

7. The resin of claim 6 in which the acid of the formula

HOOC—R—COOH is selected from the group consisting of 8,12-eicosadiene-1,20-dioic acid, 8-vinyl-10-octadecene-1,18-dioic acid and mixtures thereof.

8. A modified alkyd resin comprising the reaction products of about 30 to 50% soya fatty acids, about 15 to 35% phthalic anhydride, about 10 to 30% glycerol and an acid having the formula HOOC—R—COOH wherein R is a divalent radical having from 14 to 26 carbon atoms, said radical having two unsaturated linkages which are at least four carbon atoms removed from each other and at least four carbon atoms removed from the carboxy groups, said polyester being prepared at temperatures ranging from about 100 to about 300° C.

9. The alkyd resin of claim 8 in which the acids of the formula HOOC—R—COOH selected from 8,12-eicosadiene-1,20-dioic acid, 8-vinyl-10-octadecene-1,18-dioic acid and mixtures thereof.

10. A polyester resin having an acid number ranging from about 5 to 50 comprising the reaction product of a mixture of (A) an acid component selected from the group consisting of polycarboxylic acids, anhydrides of polycarboxylic acids and mixtures thereof, said acid component having from 2 to 10 carbon atoms and containing only carbon, hydrogen and oxygen, (B) a polyhydric alcohol having from 3 to 10 carbon atoms and having at least two esterifiable hydroxyl groups, and (C) 5 to 95% of a modifying agent comprising a dicarboxylic acid different from (A) having the formula

HOOC—R—COOH wherein R is a divalent radical having from 14 to 26 carbon atoms, said radical having two unsaturated linkages which are at least 4 carbon atoms removed from each other and at least one carbon atom removed from the carboxylic groups, the amount of (A) and (B) as to each other ranging from equal molar amounts to an excess of (B), said polyester being prepared at temperatures ranging from about 100 to about 300° C.

11. A polyester resin of claim 10 wherein the polyhydric alcohol is present in excess in amounts up to 40 mole percent of the acid component (A).

12. The polyester resin of claim 10 wherein the modifying agent is selected from the group consisting of 8,12-eicosadiene-1,20-dioic acid, 8-vinyl-10-octadeca-1,18-dioic acid and mixtures thereof.

References Cited in the file of this patent

UNITED STATES PATENTS

| | | |
|---|---|---|
| 2,352,461 | Walker | June 27, 1944 |
| 2,394,909 | Gleason | Feb. 12, 1946 |
| 2,623,033 | Snyder | Dec. 23, 1952 |
| 2,650,211 | Dannenberg et al. | Aug. 25, 1953 |
| 2,680,713 | Lindsey et al. | June 8, 1954 |
| 2,811,551 | Coffman et al. | Oct. 29, 1957 |